(12) United States Patent
Jiang

(10) Patent No.: US 9,086,583 B1
(45) Date of Patent: Jul. 21, 2015

(54) SYSTEMS AND METHODS FOR CONTROLLING AND MEASURING MODES POSSESSING EVEN AND ODD SYMMETRY IN A PHOTONIC CRYSTAL WAVEGUIDE

(71) Applicant: Wei Jiang, Piscataway, NJ (US)

(72) Inventor: Wei Jiang, Piscataway, NJ (US)

( * ) Notice: Subject to any disclaimer, the term of this patent is extended or adjusted under 35 U.S.C. 154(b) by 189 days.

(21) Appl. No.: 13/945,291

(22) Filed: Jul. 18, 2013

Related U.S. Application Data

(60) Provisional application No. 61/672,948, filed on Jul. 18, 2012.

(51) Int. Cl.
*G02F 1/035* (2006.01)
*G02F 1/01* (2006.01)
*G01N 21/17* (2006.01)

(52) U.S. Cl.
CPC ............... *G02F 1/011* (2013.01); *G01N 21/17* (2013.01)

(58) Field of Classification Search
CPC .... G02B 6/1225; G02B 6/2935; G02F 1/011; G02F 1/225; G02F 1/2255; G02F 2001/212; G02F 2203/50; G02F 2202/32; G01N 21/17; G01M 11/3145; G01M 11/335
USPC ............................. 385/3, 24, 31, 50; 356/73.1
See application file for complete search history.

(56) References Cited

U.S. PATENT DOCUMENTS

| | | | |
|---|---|---|---|
| 7,403,670 B1* | 7/2008 | Doerr | 385/1 |
| 7,421,179 B1* | 9/2008 | Jiang et al. | 385/129 |
| 7,929,813 B2* | 4/2011 | Doerr et al. | 385/3 |
| 2002/0191933 A1* | 12/2002 | Tokushima | 385/129 |
| 2006/0110116 A1* | 5/2006 | Sakai et al. | 385/129 |
| 2009/0142018 A1* | 6/2009 | Gomyo et al. | 385/27 |
| 2011/0008000 A1* | 1/2011 | Tokushima | 385/21 |
| 2011/0134432 A1* | 6/2011 | Terrel et al. | 356/465 |
| 2011/0267676 A1* | 11/2011 | Dallesasse et al. | 359/279 |

* cited by examiner

*Primary Examiner* — Ellen Kim

(57) ABSTRACT

Systems and methods for controlling and measuring modes possessing even and odd symmetry in a slow-light photonic crystal waveguide. An example device comprises a photonic crystal waveguide having modes possessing even and odd symmetry, and a Mach-Zehnder coupler comprising two waveguide branches one of which has a phase adjuster. Another example device, which can be used as an optical isolator, comprises two Mach-Zehnder couplers, and a photonic crystal waveguide comprising an electro-optic modulator therein. A method of measuring a group index of a mode with odd symmetry comprises: coupling light into a photonic crystal waveguide through a Mach-Zehnder coupler with a mixed even/odd symmetry, measuring insertion loss of the combined light signal after passing through the photonic crystal waveguide, determining the spacings of adjacent peaks or valleys from the insertion loss versus wavelength plot, and using the spacings to determine the group index of the odd symmetry mode.

18 Claims, 7 Drawing Sheets

SYSTEMS AND METHODS FOR CONTROLLING AND MEASURING MODES POSSESSING EVEN AND ODD SYMMETRY IN A PHOTONIC CRYSTAL WAVEGUIDE

RELATED APPLICATION AND CLAIM OF PRIORITY

This application claims the priority benefit of U.S. Provisional Application No. 61/672,948 entitled "Systems and methods for controlling and measuring modes possessing even and odd symmetry in a photonic crystal waveguide," and filed Jul. 18, 2012, the content of which is hereby incorporated by reference in its entirety.

STATEMENT REGARDING FEDERALLY SPONSORED RESEARCH OR DEVELOPMENT

This application was developed with U.S. Government support under Grant No. FA-9550-08-1-0394, which was awarded by the Air Force Office of Scientific Research. The U.S. Government has certain rights in this application.

BACKGROUND OF THE INVENTION

1. Statement of the Technical Field

The present invention relates to optical waveguides, and more particularly to Photonic Crystal Waveguides ("PCWs") and optical isolators.

2. Description of the Related Art

PCWs can modify light propagation and dispersion characteristics through their periodic structures, thus have important applications in communications and sensing. Particularly, the slow light effect in a PCW can significantly enhance light-matter interaction, as demonstrated in significant reduction of interaction lengths for PCW based modulators and switches. To date, most of the PCW research has been focused on the TE-like mode with even symmetry. However, a PCW often has an odd TE-like mode inside the photonic bandgap exhibiting the slow light effect as well. This odd mode can potentially open up the opportunities for mode-symmetry-based novel devices, such as one-way waveguides that exploit indirect interband photonic transitions between even and odd modes. The slow light effect in PCWs can help reduce the interaction length for such transitions, enabling ultra-compact devices. To utilize this odd mode in any devices, it is crucial to control its excitation symmetry and understand its slow light spectral characteristics. Normally, this odd mode does not exhibit itself evidently in the PCW transmission spectrum because its odd symmetry prohibits its excitation by the fundamental even mode of a conventional waveguide typically used at input. Symmetry-breaking structure imperfections sometimes may induce some coupling to this odd mode, causing a decrease of PCW transmission in the odd mode band. But such imperfection-induced coupling between this odd mode and other modes is not controllable, and therefore is not useful in practice.

SUMMARY

The invention concerns systems and methods for controlling and measuring modes possessing even and odd symmetry in a photonic crystal waveguide, and designing devices based on modes possessing even and odd symmetry in such a waveguide. The primary object of the invention is to provide mode-symmetry control devices with shorter interaction lengths through slow light photonic crystal waveguides. Another object of the invention is to reduce power consumption of mode-symmetry control devices, including one type of optical isolators. Another object of the invention is to present a method for measuring spectral characteristics and a group velocity of an odd mode in a photonic crystal waveguide and using such information in subsequent device design. Other objects and advantages of the present invention will become apparent from the following descriptions, taken in connection with the accompanying drawings, wherein, by way of illustration and example, an embodiment of the present invention is disclosed.

In accordance with a preferred embodiment of the present invention, a device for controlling the mode symmetry of a photonic crystal waveguide comprises: a photonic crystal waveguide having a waveguide core along which light is guided and a Mach-Zehnder coupler comprising two waveguide branches one of which has a phase adjuster.

In accordance with another preferred embodiment of another aspect of the present invention, an optical isolator comprises: a photonic crystal waveguide having one or more cores, a first Mach-Zehnder coupler at a first end of the photonic crystal waveguide, a second Mach-Zehnder coupler at a second end of the photonic crystal waveguide, and an electro-optic modulator formed in the photonic crystal waveguide comprising at least one of a diode and a capacitor.

In accordance with another preferred embodiment of another aspect of the present invention, a method for measuring the spectral characteristics and a group velocity of an odd mode comprises: coupling light into a photonic crystal waveguide through a Mach-Zehnder coupler with a mixed even/odd symmetry, measuring insertion loss of the combined light signal after passing through the photonic crystal waveguide in a range of wavelengths, creating a graph showing the relationship of the insertion loss and a wavelength of light; determining the spacings of adjacent peaks or valleys of a line in the graph, determining a group index based on the values, and using the group index values in subsequent device design of a functional waveguide.

BRIEF DESCRIPTION OF THE DRAWINGS

Embodiments will be described with reference to the following drawing figures, in which like numerals represent like items throughout the figures, and in which:

FIG. 4(a) is a band diagram for r=0.325a.

DETAILED DESCRIPTION

Figure 1A:
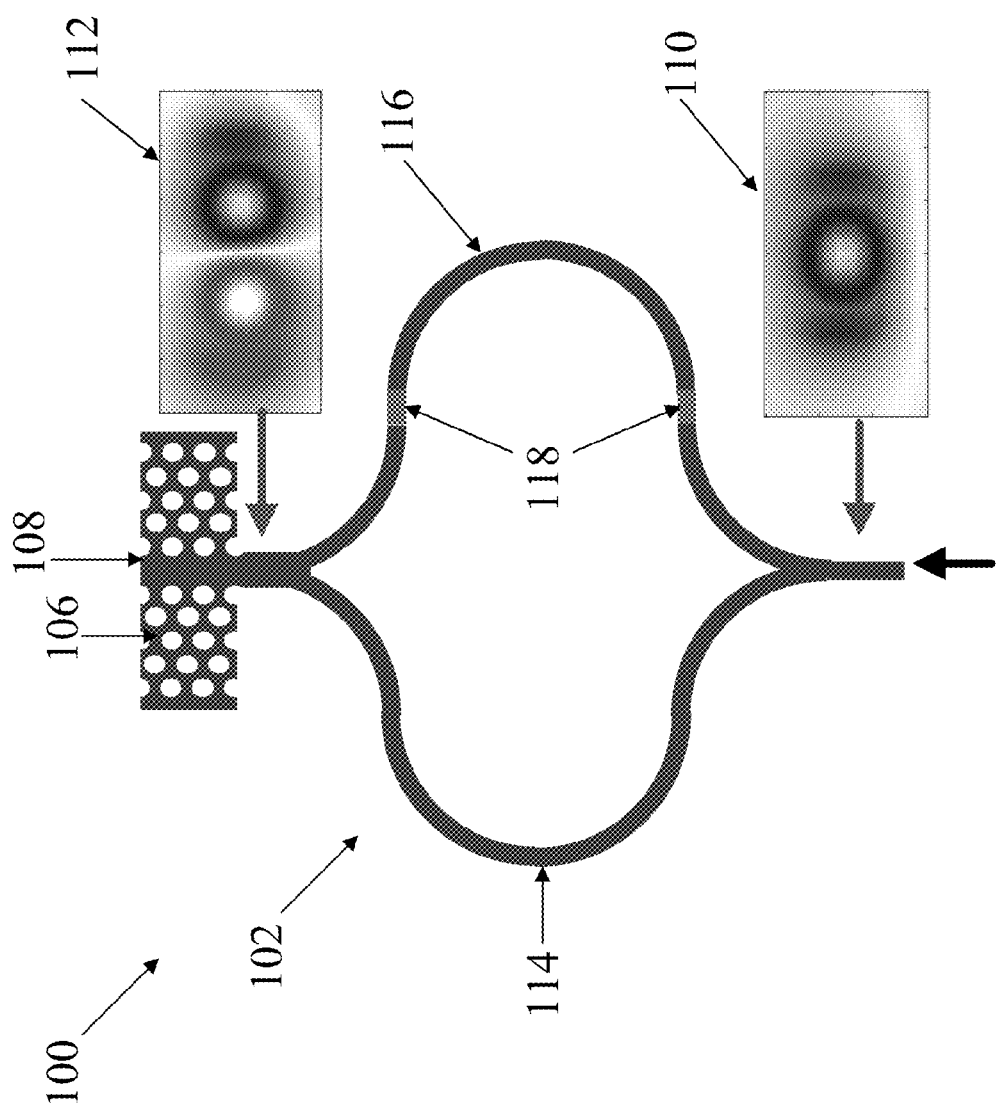
FIG. 1(a) is a schematic illustration of an exemplary system that is useful for understanding the present invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

The present invention concerns systems and methods for controlling the excitation symmetry for a high purity transmission of an odd TE-like mode in a PCW and measuring the characteristics of this mode. An exemplary system 100 is provided in FIG. 1. As shown in FIG. 1, the system 100 comprises a Mach-Zehnder Coupler ("MZC") 102 and a PCW 104. PCWs are well known in the art, and therefore will not be described herein. Still, it should be noted that the PCW may comprise silicon with an array of apertures 106 formed therein. The array 106 facilitates the confinement of light in a solid middle region 108. The solid middle region 108 can be formed of silicon.

The MZC 102 is generally configured to receive light from an input waveguide (not shown). This light has a field pattern with an even symmetry, as shown in block 110. Throughout this specification, the field pattern refers to one electric field component ($E_x$) of light unless specified otherwise. The MZC 102 converts the field pattern of the light to an odd symmetry, as shown by block 112. This conversion is achieved using branching arms 114, 116 and a phase modifier 118. The phase modifier 118 can include a passive phase modifier as shown in FIG. 1 or an active phase modifier. The passive phase modifier may be implemented by increasing the total length of one of the branching arms 114, 116 by an amount so as to provide a 180 degree phase difference between light signals traveling therethrough. The active phase modifier can be implemented by disposing electrical contacts adjacent to one of the branching arms 114, 116. In this scenario, the application of a voltage to the electrical contacts causes a phase of a light signal traveling through the branching arm 116 to change such that it is 180 degrees out of phase with the light signal traveling through the other branching arm 114. The two phase offset light signals are then combined in an end portion 120 of the MZC 102. The combined light signal has a field pattern with an odd symmetry as shown by block 112.

An output fixture may be attached to the output of the PCW 104 for further manipulation of the mode symmetry. In some embodiments, another MZC 200 may be coupled to an output 202 of the PCW 104. This MZC 200 converts the field pattern of the light signal output from the PCW 104 from an odd symmetry to an even symmetry. This conversion is achieved in the same or substantially similar manner as the conversion provided by the MZC 102. Notably, the structures shown in FIG. 1 and FIG. 2 may be used in various applications. Such applications include, but are not limited to, one way waveguide applications and isolator applications.

In some embodiments, a modulator may be formed in the PCW 104 to dynamically modulating the symmetry of mode therein. In one embodiment, the modulator may comprise one or more p-n diodes. In another embodiment, it may comprise at least one of a p-i-n diode, and a metal-oxide-semiconductor (MOS) capacitor.

In some embodiments, a photonic crystal waveguide may have two or more missing rows of holes. In one embodiment, the missing rows of holes may be immediately next to each other to form a single wide line-defect photonic crystal waveguide. In another embodiment, the missing rows of holes may be separated by one or several rows of holes, forming two waveguide cores that are coupled. In the latter embodiment, a supermode of even or odd symmetry can still exist across two waveguide cores.

In some embodiments, two or more apparatuses of this invention may be cascaded to improve the performance characteristics. In one embodiment, the output fixture of the first apparatus is coupled to the input of the second apparatus. Cascaded apparatuses are particularly useful in those embodiments where each apparatus is designed to be an optical isolator. The optical isolation may be increased as the number of cascading apparatus increase. For example, a single optical isolator formed based upon the teaching of this invention may have an optical isolation of 8 dB. Two cascaded optical isolators may achieve an overall optical isolation of 15 dB or more.

Figure 3:
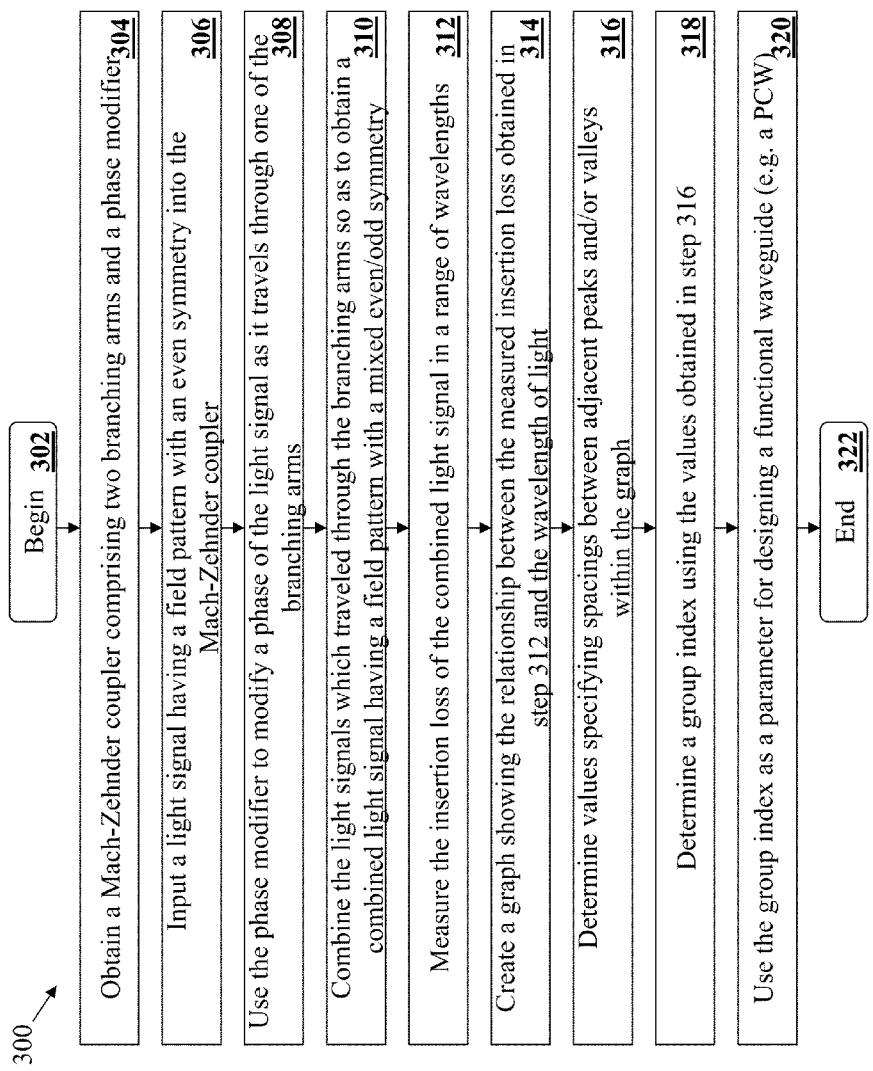
FIG. 3 is a flow diagram of an exemplary method for designing a PCW.

Referring now to FIG. 3, there is provided an exemplary method 300 for designing the PCW 104 based on operational characteristics of the MZC 102. As shown in FIG. 3, the method begins with step 302 and continues with step 304. In step 304, a MZC 102 is obtained. As noted above, the MZC 102 comprises two branching arms 114, 116 and a phase modifier 118. Next, in step 306, a light signal is input into the MZC 102. This light signal has a field pattern with an even symmetry. The phase modifier 118 is then used to modify a phase of the light signal as it travels through one of the branching arms, as shown by step 308. In a next step 310, the light signals which traveled through the branching arms 114, 116 are combined so as to obtain a combined light signal. The combined light signal has a field pattern with a mixed even/odd symmetry.

The insertion loss of the combined light signal is then measured in a range of wavelengths, as shown by step 312. A graph showing the relationship between the measured values obtained in step 312 and the wavelength of light is created in step 314. After this graph is created, step 316 is performed where values specifying spacings between adjacent peaks and/or valleys of a line connecting plotted points within the graph are determined. These values are then used in step 318 to determine a group index. Group index is well known in the art, and therefore will not be described herein. The group index may be used as a parameter for designing a functional waveguide, such as PCW 104, a passive silicon waveguide or a waveguide with a modulator.

Example 1

The following EXAMPLE 1 is provided for purposes of explaining in more detail the present invention. The present invention is not limited to the contents of the following discussion discussed under the heading EXAMPLE 1.

Figure 4A:
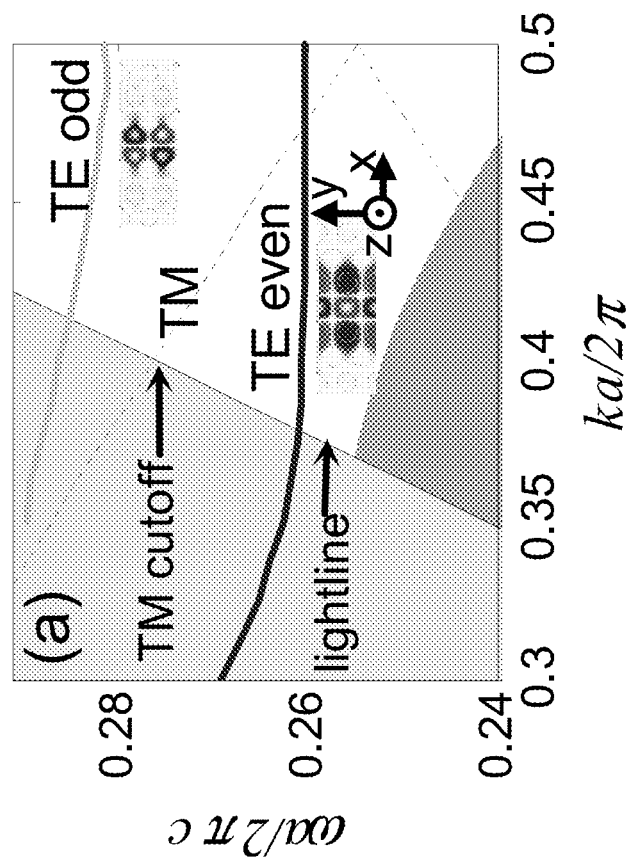

Consider a W1 PCW formed on a Silicon-On-Insulator ("SOI") wafer by removing a row of air holes in a hexagonal lattice with lattice constant a=400 nm, hole radius r=0.325a, and Si slab thickness t=260 nm. The band diagram in FIG. 4(a) is calculated by 3D plane wave expansion. Below the lightline (for the oxide bottom cladding), the even TE-like mode has a flat dispersion relation with group index $n_g$>50, and a narrow bandwidth (<4 nm). In contrast, below the lightline, the odd TE-like mode has a much wider bandwidth ~20 nm with $n_g$ down to ~15. Such a moderate $n_g$ range is favorable for many applications as various types of losses are reduced at lower $n_g$. Furthermore, the dispersion relation of the TM-like guided mode usually crosses that of the even mode, as seen in FIG. 4(a). But the TM-like mode does not cross the odd mode in the region below the lightline in FIG. 4(a). For $\epsilon a/2\pi c$=0.28~0.286, only the odd mode is below the lightline.

Figure 4B:
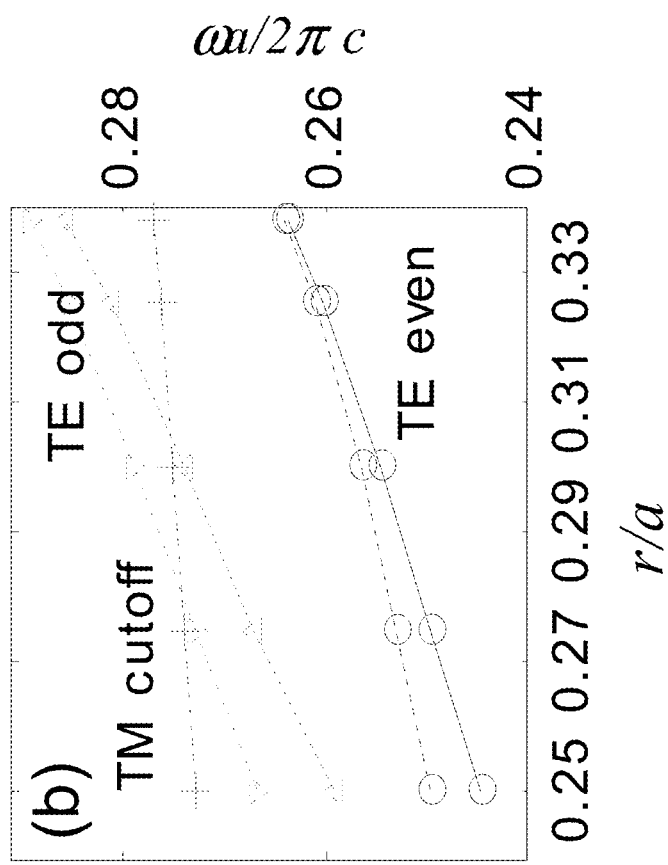
FIG. 4(b) is a graph showing a variation of the band edge and cutoff of even and odd TE-like modes with hole radius.

Systematic simulations show that as the hole radius increases, the odd-mode bandedge moves up faster than the TM cutoff, as shown in FIG. 4(b). For a sufficiently large r, the TM cutoff is below the odd mode bandedge; thus the two modes do not cross each other below the lightline, helping avoid their inter-coupling due to asymmetric top and bottom claddings. However, as r increases, the transmission bandwidth bounded by the bandedge and the cutoff decreases for both the even and odd modes, as shown in FIG. 4(b). Hence, this work focuses on the intermediate r case shown in FIG. 4(a), which shows a sufficient clearance between the odd mode bandedge and the TM cutoff, and a sufficiently wide bandwidth.

Figure 1B:
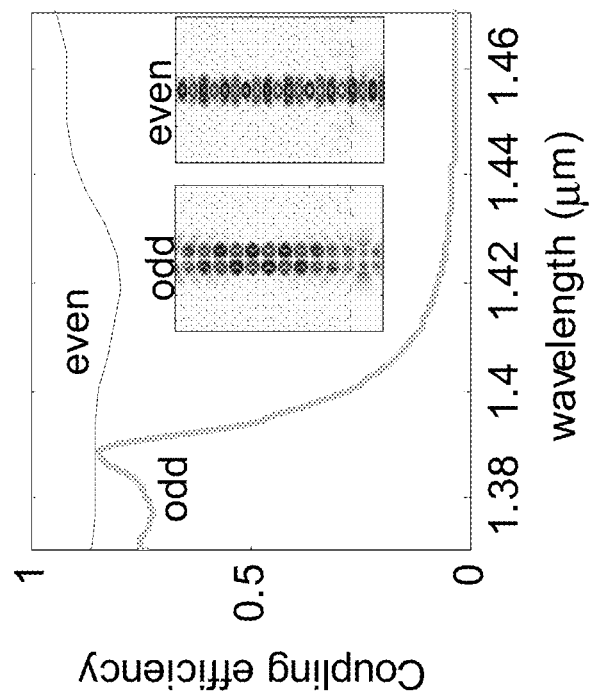
FIG. 1(b) is a graph showing a relationship between a coupling efficiency of an exemplary system and the wavelength of light.

Excitation of this odd PCW mode is usually deterred by the opposite symmetry of the fundamental even mode of a Si waveguide. To solve this problem, a two-step approach is employed. First, a MZC whose two arms have a phase difference of π is utilized to transform mode symmetry and excite an odd mode in a wide (multimode) Si wire waveguide; then this odd mode is coupled to the odd mode of the PCW. To create π phase difference in this odd-mode MZC, its two arms can be designed to have a length difference of $(\Delta l)_\pi = \lambda/2n_{eff}$, where $n_{eff}$ is the effective index of the Si waveguide. A Finite Difference Time-Domain ("FDTD") simulation confirmed that such a MZC produces an odd mode in a wide output waveguide, as shown in FIG. 1(a). The input and output waveguide widths are 400 nm and 700 nm respectively. The coupling between the odd mode of a Si wire waveguide (700 nm wide) and that of the PCW is also simulated. Simulation results in FIG. 1(b) show coupling efficiencies up to ~84% (~0.75 dB) for the odd mode. The field pattern in FIG. 1(b) left inset confirms that the coupled PCW mode is an odd mode. The fundamental even mode of an Si wire waveguide couples into the PCW with inconsequential change of coupling efficiency for the spectral range in FIG. 1(b). The field pattern in FIG. 1(b) right inset indicates that the coupled mode has even symmetry. Indeed, this mode is an even TE-like mode above the lightline. The $E_x$ field has been shown in FIGS. 1(a)-1(b) for direct comparison with the modes of the conventional Si waveguide, whose TE-modes are commonly visualized by $E_x$ (note $E_x$ and $H_z$ have the same symmetry with respect to x).

Figure 2:
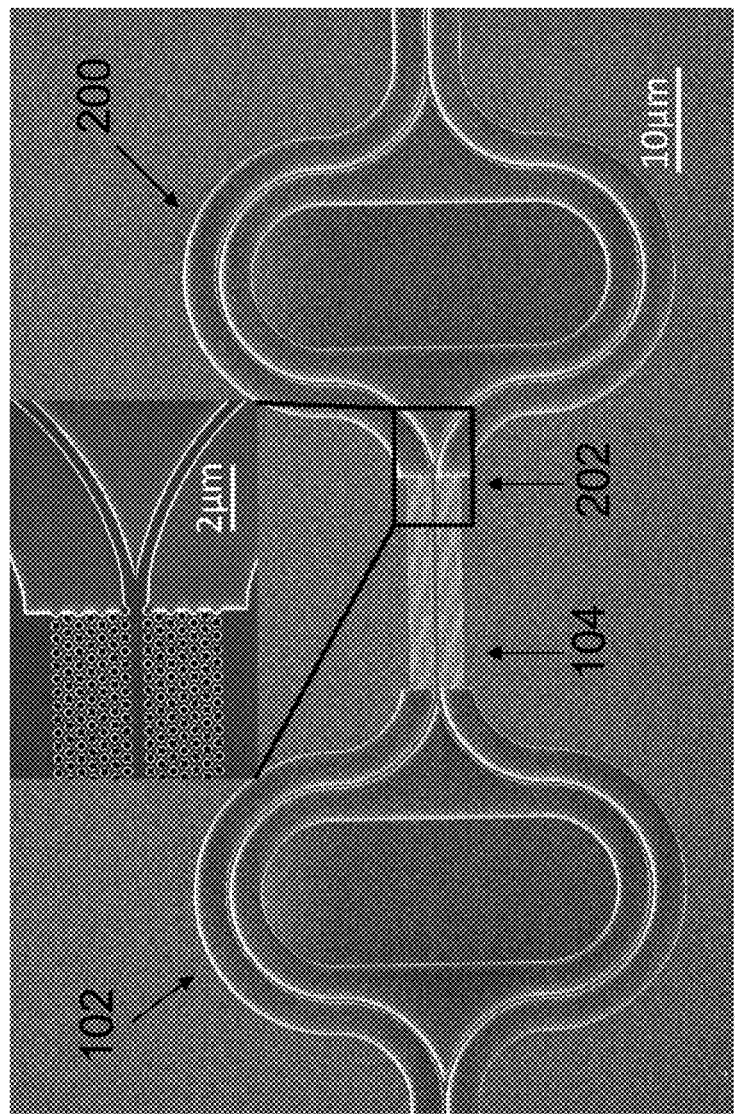
FIG. 2 is a schematic illustration of an exemplary system that is useful for understanding the present invention.

The photonic crystal waveguide structure is fabricated on an SOI wafer with a 2 μm buried oxide layer and a 260 nm top Si layer according to the parameters used in FIG. 4(a). The structure is patterned by a JEOL JBX-6300FS high-resolution e-beam lithography system, operating at 100 keV, on a 100 nm thick layer of ZEP 520A e-beam resist. Then the pattern is transferred to the Si layer by an Oxford Plasmalab 100 ICP etcher. FIG. 2 is a Scanning Electron Microscope ("SEM") image of the fabricated structure. Two MZCs with a 10 μm bending radius are connected through 700 nm-wide Si waveguides of 1 μm lengths to both ends of the PCW.

Figures 5A, 5B, 5C, 5D:
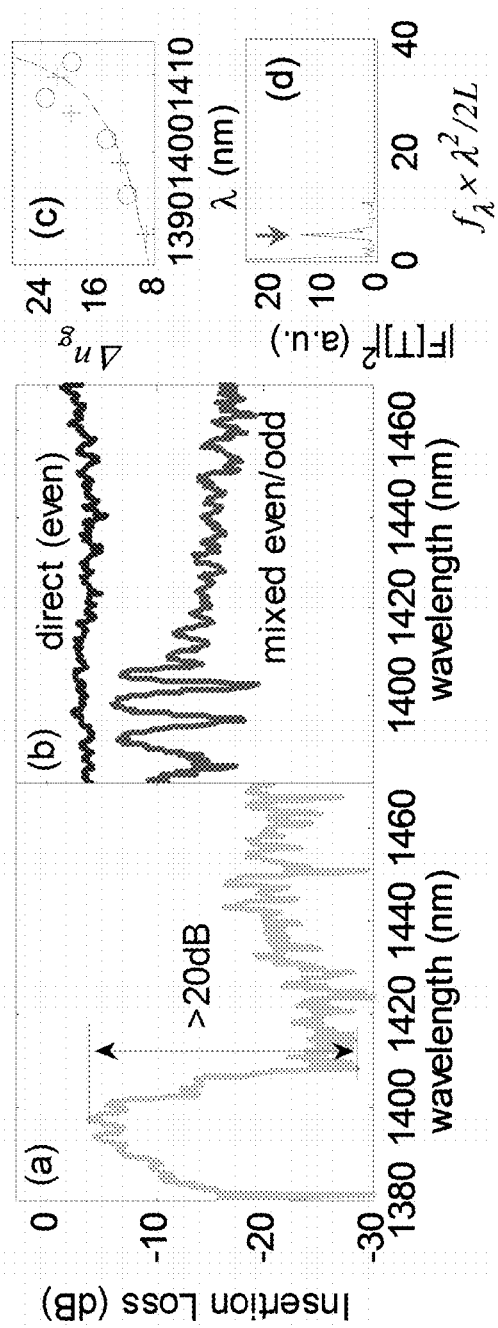
FIG. 5(a) is a graph showing a relationship between an insertion loss of an odd-mode Mach-Zehnder coupler and a plurality of different wavelengths.
FIG. 5(b) is a graph showing a first relationship between an insertion loss of an even-mode without a Mach-Zehnder coupler and the wavelength of light, and a second relationship between an insertion loss of a mixed even/odd mode Mach-Zehnder coupler and the wavelength of light.
FIG. 5(c) is a graph showing the difference of the group indices, $\Delta n_g$, obtained from the mixed even/odd mode spectrum of FIG. 5(b).
FIG. 5(d) is a graph showing a Fourier transform of the transmission spectrum of a directly coupled PCW.

To measure transmission spectra, light from a super-luminescent LED with a spectral range of about 80 nm is coupled to the TE mode of Si access waveguides (tapered to 4 μm at chip edges) via lensed fibers. A polarizer is used at the output end to block TM polarization. The PCW insertion loss is measured with reference to an Si wire waveguide. FIG. 5(a) shows the spectrum of a PCW with odd-mode MZCs. A substantial transmission bandwidth is observed, approximately 22 nm at 10 dB below the peak. The contrast between the transmitted mode and background is >20 dB. The peak insertion loss is about ~4 dB. Separate measurements show that each MZC contributes ~1 dB. Thus, the loss due to the PCW is estimated ~2 dB. For comparison, the spectrum of a directly coupled PCW without MZCs is shown in FIG. 5(b). The transmission is due to the leaky even TE-like mode as simulated in FIG. 1(b). FIG. 5(b) also shows the PCW transmission with MZCs whose two arms have a length difference Δl deliberately designed to be 50% greater than $(\Delta l)_\pi$. Such a mixed-mode MZC offers a symmetry configuration that can excite a mixture of even and odd modes according to $I_\pm \infty (\frac{1}{2})[1 \pm \cos(2\pi n_{eff} l/\lambda)]$. As such, the background transmission due to the even mode rises. In the odd mode band, the mixed-mode spectrum oscillates strongly due to the beating of two modes. FIGS. 5(a)-5(b) illustrate that distinctive spectral signatures can be observed with controlled excitation symmetries.

The mode-beating pattern of the mixed-mode spectrum contains important information of the odd mode. The beating period is related to the group indices of even and odd modes through $\Delta\lambda = \lambda^2/(n_{g,odd} - n_{g,even})L$, where L is the PCW length. Simulation indicates that $n_{g,even}$ is virtually a constant (~5) in the odd mode band. Thus, the chirped beating periods are due to the dispersion of $n_{g,odd}$. $\Delta n_g = n_{g,odd} - n_{g,even}$ was calculated from the mixed-mode spectrum and plotted it in FIG. 5(c). The peak-spacing and valley-spacing of the spectrum give two sets of $\Delta n_g$ data, plotted by circles and crosses, respectively. The peak-spacing and valley-spacing agree with each other as expected. The $\Delta n_g$ value obtained from two adjacent peaks (valleys) is assigned to the mid-point wavelength in-between. Further, $n_{g,even}$=4.9 is obtained in FIG. 5(d) through the Fourier transform of the transmission spectrum of another directly coupled PCW with more obvious spectral ripples. The Fourier frequency $f_2$ is just the inverse of the spectral oscillation period $\delta\lambda$, thus $n_{g,even}=f_\lambda \times \lambda^2/2L$. Based on FIGS. 5(c)-5(d), $n_{g,odd}=\Delta n_g+n_{g,even}$ is in the range of 14~29. The F-P oscillation amplitude in FIG. 5(a) is relatively weak. In contrast, the mode-beating amplitude of the mixed-mode spectrum in FIG. 5(b) is much higher and more robust against noise, which facilitates the evaluation of $n_{g,odd}$. Also as shown in FIG. 5(a), the background transmission increases discernibly beyond 1430 nm due to the dispersive effect in the odd-mode MZC, which modifies the phase shift difference between the two arms as $\lambda$ deviates far from the designed value (1390 nm). The TM-like mode (guided for $\lambda$>1.45 μm) may also contribute to the background at long wavelengths. However, these effects are much weaker for 1380-1415 nm.

Although this example focuses on PCWs on an SOI chip, the MZC and the mode-beating based $n_{g,odd}$ measurement method can be adapted to the cases of air-bridge or oxide-covered PCWs, and coupled-cavity PCWs. The odd mode wavelength can also be shifted to ~1550 nm or other values (depending on specific applications) by changing the lattice constant. In an SOI PCW, there is some coupling between the TE-like guided modes and the TM-like photonic crystal bulk modes due to asymmetric top/bottom claddings. Prior work on the even mode has demonstrated that reducing $n_g$ can reduce the loss due to such coupling. This odd mode has a much lower $n_g$~14 than the normal even mode ($n_g$~50) below the lightline. This helps to reduce the coupling to the TM-like bulk modes. For many PCW devices operating at a short length <80 μm, the propagation loss of the odd mode is expected to be reasonable. Lastly, the understanding of the slow light and mode-beating characteristics of this odd mode, and the controlled excitation and $n_{g,odd}$ characterization schemes developed here can facilitate the development of mode-symmetry based novel devices, such as one-way waveguides that involve active transition and passive conversion between even and odd modes. Slow light can help reduce device interaction length. The odd-mode MZC of the present invention is focused on transforming mode symmetry to attain high purity odd-mode; and the mixed-mode MZC offers a symmetry configuration for coherent mixing of even and odd modes, which enables $n_{g,odd}$ measurement through slow-light mode beating.

In summary, the present invention provides a novel approach to controlling an excitation symmetry for an odd TE-like mode in a PCW. An odd-mode MZC is utilized to selectively excite the odd mode with a contrast >20 dB over the background. Assisted by a mixed-mode MZC, slow-light mode beating is observed and is utilized to measure the group index of this odd mode.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

What is claimed is:

1. An apparatus, comprising:
   a plurality of branching waveguides through which a plurality of light signals propagate that originally have field patterns with even symmetries;
   a functional waveguide coupled to the plurality of branching waveguides;
   an output fixture coupled to the functional waveguide; and
   at least one phase adjuster configured to modify a phase of one of the plurality of light signals propagating through one of the plurality of branching waveguides;
   wherein the plurality of branching waveguides provide a combined light signal to the functional waveguide that has a field pattern with an even symmetry, an odd symmetry or a mixed even/odd symmetry, the combined light signal obtained by combining the plurality of light signals.

2. The apparatus of claim 1, wherein the plurality of branching waveguides comprise a Mach-Zehnder coupler.

3. The apparatus of claim 1, wherein the functional waveguide comprises an array of apertures formed in at least one of silicon, germanium, carbon, gallium nitride, gallium arsenide, gallium phosphide, indium nitride, indium phosphide, indium arsenide, aluminum arsenide, aluminium antimonide, zinc oxide, zinc sulfide, silicon oxide, silicon nitride, lithium niobate, strontium barium niobate, barium titanate, lead zirconate titanate, lead lanthanum zirconate titanate, alloys thereof, and organic polymers.

4. The apparatus of claim 1, wherein the functional waveguide comprises at least one of a photonic crystal waveguide, a passive waveguide, and a waveguide with a modulator.

5. The apparatus of claim 1, wherein the apparatus is a one way waveguide or an optical isolator.

6. The apparatus of claim 1, wherein the phase is modified such that first and second ones of the plurality of light signals have a phase difference therebetween that is less than, equal to, or greater than 180 degrees.

7. The apparatus of claim 1, wherein the phase adjuster comprises an active waveguide wherein the phase of a light signal can be adjusted by applying a voltage, pressure, or heat.

8. The apparatus of claim 1, wherein a phase, intensity, or field pattern symmetry of light signal in the functional waveguide is modified, the field pattern symmetry at the end of the functional waveguide being one of even symmetry, odd symmetry, or a mixed even/odd symmetry.

9. The apparatus of claim 1, wherein a plurality of oppositely doped semiconductor regions are formed in the functional waveguide.

10. The apparatus of claim 1, wherein the functional waveguide comprises at least one of a p-n diode, a p-i-n diode, and a capacitor.

11. The apparatus of claim 1, wherein the functional waveguide comprises an array of a p-n diode, a p-i-n diode, or a capacitor.

12. The apparatus of claim 3, wherein one row, two rows, or more rows of apertures are absent in the array of apertures, the missing rows of apertures being adjacent to each other or not adjacent to each other.

13. The apparatus of claim 1, wherein the output fixture comprises at least one of a passive waveguide, a photonic crystal waveguide, and a plurality of branching waveguides.

14. A plurality of apparatuses of claim 1, wherein the output fixture of at least one of the apparatuses is coupled to at least one of a functional waveguide of one of the other apparatuses, a plurality of branching waveguides of one of the other apparatuses, and an output fixture of one of the other apparatuses.

15. A method for measuring and designing a functional waveguide, comprising:
- splitting an incoming light signal into a plurality of light signals, the incoming light signal having a first field pattern with an even symmetry;
- propagating the plurality of light signals through a plurality of branching waveguides;
- modifying a phase of at least one of the light signals while it propagates through a respective one of the plurality of waveguides;
- combining the plurality of light signals to obtain a combined light signal having a second field pattern with an even symmetry, an odd symmetry or a mixed even/odd symmetry;
- measuring insertion loss of the combined light signal after passing through the functional waveguide in a range of wavelengths;
- creating a graph showing the relationship of the insertion loss and a wavelength of light;
- determining values specifying spacings between adjacent peaks or valleys of a line in the graph;
- determining a group index based on the values; and
- using the group index as a parameter for designing the functional waveguide.

16. The method of claim 15, wherein the functional waveguide comprises at least one of a photonic crystal waveguide, a passive waveguide, and a waveguide with a modulator.

17. The method of claim 15, wherein the functional waveguide comprises an array of apertures formed in at least one of silicon, germanium, carbon, gallium nitride, gallium arsenide, gallium phosphide, indium nitride, indium phosphide, indium arsenide, aluminum arsenide, aluminium antimonide, zinc oxide, zinc sulfide, silicon oxide, silicon nitride, lithium niobate, strontium barium niobate, barium titanate, lead zirconate titanate, lead lanthanum zirconate titanate, alloys thereof, and organic polymers.

18. A method for measuring group velocities of modes possessing even and odd symmetry in a functional waveguide, comprising:
- measuring light transmission through an optical coupler and a functional waveguide in a range of wavelengths;
- calculating differences in the group indices of the modes from measured values obtained during the measuring step; and
- using known values of the group index of one of the even mode and the odd mode and the differences in the group indices from the measuring step to determine the unknown group velocity of the other mode.

* * * * *